United States Patent
Chapin et al.

(10) Patent No.: US 6,496,277 B1
(45) Date of Patent: Dec. 17, 2002

(54) DATA FLOW CONTROL AND STORAGE FACILITY FOR AN IMAGE REPRODUCTION SYSTEM

(75) Inventors: Robert Michael Chapin, Rushville; Gordon Francis Lupien, Jr., Ontario; Anthony Michael Frumusa, Penfield, all of NY (US)

(73) Assignee: Xerox Corporation, Rochester, NY (US)

(*) Notice: Subject to any disclaimer, the term of this patent is extended or adjusted under 35 U.S.C. 154(b) by 0 days.

(21) Appl. No.: 09/360,309

(22) Filed: Jul. 23, 1999

(51) Int. Cl.[7] .............................................. G06K 15/00
(52) U.S. Cl. .................................................... 358/1.16
(58) Field of Search ................................ 358/1.1, 1.15, 358/1.16, 1.17, 426.05, 426.02, 404, 444, 1.13, 442, 407, 468; 345/530, 532, 536, 537, 538; 710/22, 74

(56) References Cited

U.S. PATENT DOCUMENTS

| 5,303,341 A | 4/1994 | Rivshin | 395/162 |
| 5,517,325 A | 5/1996 | Shimatani | 358/444 |
| 5,581,740 A | 12/1996 | Jones | 395/500 |
| 6,052,199 A | * 4/2000 | Honda | 358/1.16 |
| 6,337,746 B1 | * 1/2002 | Coyle et al. | 358/1.13 |

FOREIGN PATENT DOCUMENTS

| EP | 864 984 A2 | 9/1998 |
| WO | WO 97/39422 A1 | 10/1997 |

* cited by examiner

Primary Examiner—Arthur G. Evans
(74) Attorney, Agent, or Firm—Oliff & Berridge, PLC

(57) ABSTRACT

An image data flow control and storage facility having a secondary storage, a secondary storage controller, an image input controller, an image output controller and an optional loop-back controller. According to one embodiment, the image input controller, the image output controller and the loop-back controller communicate with the secondary storage controller by way of a PCI-type bus. The secondary storage controller communicates with the secondary storage by way of an SCSI interface. Preferably, the secondary storage controller operates in master mode to transfer blocks of image data directly between the secondary storage and the image output, image input and loop-back controllers. By performing direct image data transfers, the facility of the invention avoids intermediately storing image data in costly DRAM page buffers.

22 Claims, 6 Drawing Sheets

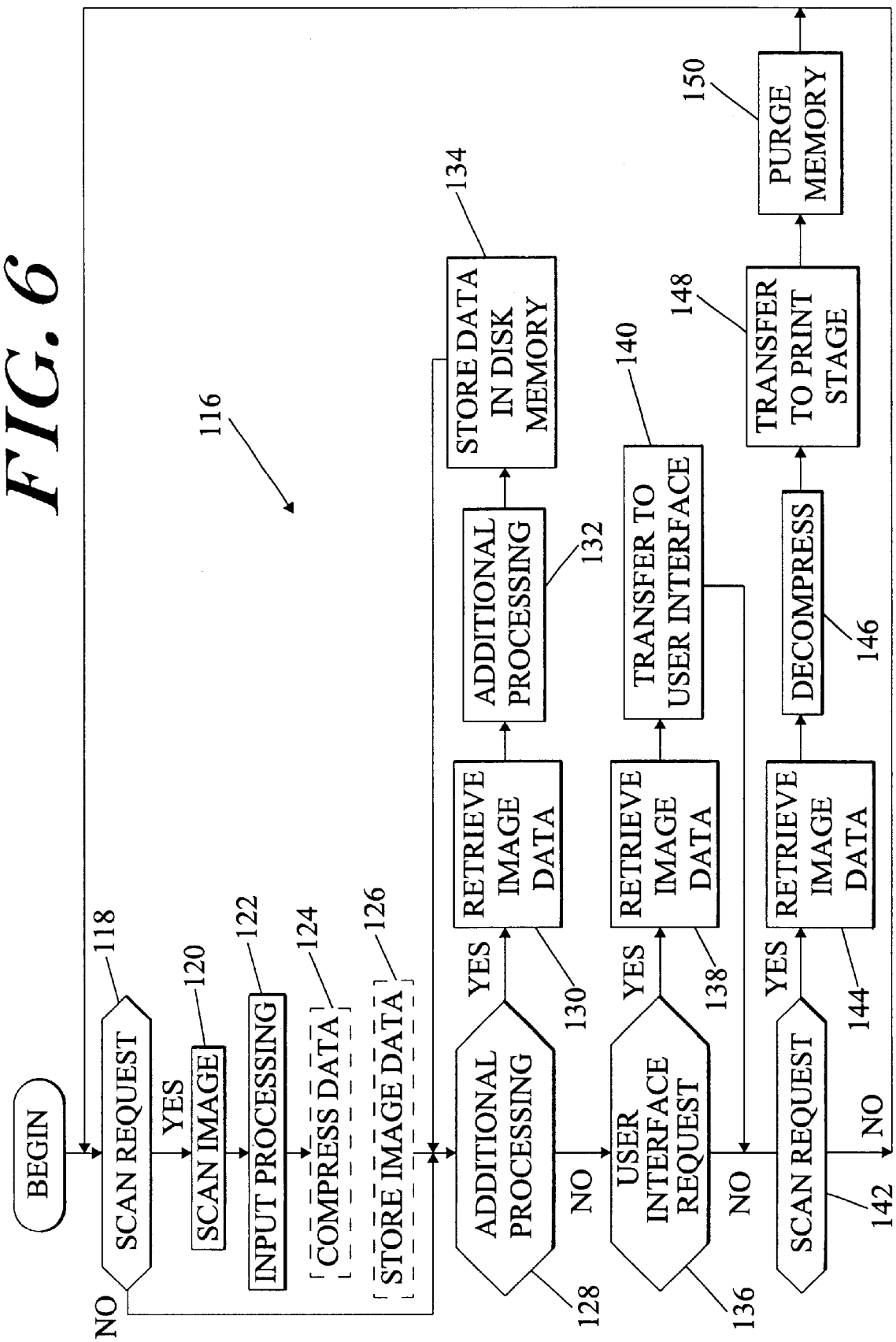

DATA FLOW CONTROL AND STORAGE FACILITY FOR AN IMAGE REPRODUCTION SYSTEM

TECHNICAL FIELD

The invention relates to improved image reproduction systems. More particularly, the invention is directed to a data flow control and storage facility for reducing the amount of electronic memory in an image reproduction system.

BACKGROUND OF THE INVENTION

Electrophotographic copiers, such as digital copiers, are widely used in many business and commercial environments. In a digital copier an input scanning facility captures a document image, and converts the captured image into digital data. A control unit then compresses the image data and either forwards the compressed data to a suitable printing facility, or stores the data in a system memory. System memory typically includes both magnetic disk storage and electronic storage. In conventional systems, electronic storage consists of random access memory (RAM) devices, such as DRAM. The DRAM is used essentially as a page buffer for intermediate storage of image data. To store an 8.5×11.0 inch image having 600×1200 dots per square inch (dpsi), monochrome applications typically require 8.4 M-bytes of DRAM. Additionally, even relatively low-end copiers require an image data bandwidth of 6 to 7 M-bytes per second. A drawback of storing the image data in DRAM is that it is expensive relative to other, cheaper secondary storage devices, such as a magnetic disk, magnetic tape, optional disk or non-DRAM solid state memories.

To reduce the amount of DRAM required, conventional copiers spool image data from DRAM to magnetic disk memory during scanning. Subsequently, the copier spools the image data from magnetic disk back to DRAM for printing. To facilitate data transfer between DRAM and the magnetic disk memory, conventional high-performance SCSI-based disk subsystems operate disk controllers as bus masters. Operating in master mode, the disk controller can increase the rate with which data is spooled between magnetic disk memory and DRAM. However, even with the above discussed improvements, conventional copiers, nevertheless, continue to employ large amounts of expensive DRAM, and to waste significant time performing spooling operations.

Accordingly, it is an object of the invention to reduce system costs by reducing the amount of DRAM required to operate image reproduction systems.

Another object of the invention is to increase the speed with which image data can be transferred by reducing the number of spooling operations.

The invention will next be described in connection with certain preferred embodiments. However, it should be clear that various changes and modifications can be made by those skilled in the art without departing from the spirit and scope of the invention.

SUMMARY OF THE INVENTION

The invention attains the foregoing objects by providing a data flow control and storage facility (hereinafter a "control and storage facility") for operation within an image reproduction system. According to one embodiment, the control and storage facility includes a digital communication bus, a secondary storage device, an image output controller, an image input controller and a secondary storage controller. The image output controller, image input controller and secondary storage controller are in digital communication over the digital communication bus. Optionally, the secondary storage device and the secondary storage controller communicate by way of an SCSI interface. In a further embodiment, the secondary storage device may be magnetic tape, magnetic disk, optical disk, solid state memory or any other type of digital storage other than DRAM.

The digital communication bus, optionally a PCI-type bus, transfers digital image data in the image reproduction system. The secondary storage device stores the digital image data. The image output controller receives digital image data by way of the digital communication bus and can output the received digital image data to an external destination. The image input controller is adapted for receiving digital image data from an external source and for transferring the received digital image data by way of the digital communication bus.

The secondary storage controller is adapted for transferring digital image data directly from the secondary storage device to the image output controller by way of the digital communication bus. The secondary storage controller is also adapted for transferring digital image data directly from the image input controller to the secondary storage device. Optionally, the secondary storage controller operates in master mode to gain control of the digital communication bus, and transfers blocks of digital image data in a burst format. In a further embodiment, the secondary storage controller includes a buffer cache memory having a write buffer portion and a read buffer portion. The write buffer portion can accumulate a block of digital image data for direct transfer from the image input controller to the secondary storage device. In a similar fashion, the read buffer portion can accumulate a block of digital image data for direct transfer from the secondary storage device to the image input controller. According to one preferred embodiment, the buffer cache memory is a FIFO-type cache memory.

In a further embodiment, the image output controller includes an output cache memory for accumulating a block of digital image data for outputting. Further, the secondary storage controller includes a read master controller. The read master controller determines whether the output cache memory has enough storage available to receive a block of digital image data. In response to determining that enough storage is available, the master controller writes a block of digital image data from the read buffer portion of the buffer cache memory directly to the output cache memory.

Optionally, the read master controller queries the image output controller to determine whether the output cache memory has enough storage available to receive a block of digital image data. Additionally, the image output controller includes output control elements in digital communication with the output cache memory and with the digital communication bus. In response to a query from the read master controller, the output control elements signal the read master controller regarding whether there is enough storage available in the output cache memory to receive a block of digital image data. According to a further embodiment, the output control elements signal a PCI-type disconnect to the read master controller in response to the output cache memory having insufficient storage available.

According to another embodiment of the invention, the image input controller includes an input cache memory for accumulating a block of digital image data for transfer to the write buffer portion of the buffer cache memory. Additionally, the secondary storage controller includes a write master controller for determining whether the input cache memory has accumulated a block of digital image data. In response to determining that a block of digital image data has been accumulated, the write master controller transfers the block of digital image data directly from the input cache memory to the input buffer portion of the buffer cache.

According to a further embodiment, the write master controller signals the image input controller to determine whether the input cache memory has accumulated a block of image data. Additionally, the image output controller includes input control elements in digital communication with the input cache memory and with the digital communication bus. Optionally, in response to the input cache memory not having a block of data accumulated, the input control elements signal the write master controller with a PCI-type disconnect, without transferring any image data.

In an alternative embodiment, the control and storage facility of the invention includes a loop-back channel controller in digital communication with the digital communication bus and adapted for receiving digital image data by way of the digital communication bus and for outputting the received digital image data for additional processing. Additionally, the secondary storage controller is further adapted for transferring digital image data directly to the loop-back channel controller by way of the digital communication bus.

According to additional embodiments, the control and storage facility includes a secondary storage device for storing image data within an image reproduction system; elements for transferring image data from a source external to the control and storage facility to the secondary storage device, without intermediately storing the image data in DRAM; and elements for transferring the image data from the secondary storage device to a destination, external to the control and storage facility, without intermediately storing the image data in a DRAM.

In yet another embodiment, the control and storage facility includes a secondary storage device for storing image data within the image reproduction system; elements for transferring image data, optically scanned into the image reproduction system, into the secondary storage device without intermediately storing the image data in a DRAM buffer; and elements for transferring the image data, stored in the secondary storage device, to an image data output interface of the image reproduction system, without intermediately storing the image data in a DRAM buffer.

According to an alternative embodiment, the invention comprises a method of transferring image data in an image reproduction system. According to one embodiment, the method includes the steps of transferring digital image data from an image input section of the image reproduction system directly to a secondary storage device, without intermediately storing the digital image data in a DRAM buffer; and transferring the image data from the secondary storage device to an image output section of the image reproduction system, without intermediately storing the digital image data in a DRAM buffer.

Thus, the invention provides an improved image data flow control and storage facility, along with related methods, for operation in an image reproduction system. According to the improvements of the invention, image data can be transferred directly from an input interface, such as an optical scanner interface, to a secondary storage device, such as magnetic or optional memory, without intermediately storing the scanned image data in a DRAM buffer. Similarly, the image data can be transferred directly from the secondary storage device to an output interface, such as a printer interface or a supplemental processor interface, also without being stored intermediately in a DRAM buffer.

BRIEF DESCRIPTION OF THE DRAWINGS

The subject matter regarded as the invention is particularly pointed out and distinctly claimed in the concluding portion of the specification. The invention, however, both as to organization and methods of practice, together with further objects and advantages, may best be understood by reference to the following illustrative description taken in conjunction with the accompanying drawings in which like numerals refer to like elements, and in which

FIG. 6 is a flow chart illustrating a methodology embodying features of a data flow control and storage facility according to the teachings of the invention.

DESCRIPTION OF ILLUSTRATED EMBODIMENTS

The invention provides a system for improving data flow in an image forming or reproduction system by eliminating or reducing intermediate data transfers between secondary memory and electronic memory. The invention also provides a system for reducing the amount of electronic memory used in image forming or reproduction systems by transferring image data directly between the secondary memory and I/O devices. This approach provides an advantage over conventional systems, which repeatedly spool image data between the secondary memory and electronic memory, such as DRAM, thus using the DRAM as a page buffer.

The invention can be employed in a number of different types of image forming or reproduction systems, examples of which include electrophotographic, electrostatic, ionographic, and the like, which are adapted to capture and/or store image data associated with a particular object, such as a document. The system of the invention is intended to be implemented in a variety of environments, such as in any of the foregoing types of image reproduction systems, and is not limited to the specific system described herein. Although, in the illustrative embodiments, a system and method of the invention are described in the context of a digital image copier, the invention is not intended to be limited to such techniques.

Figure 1:
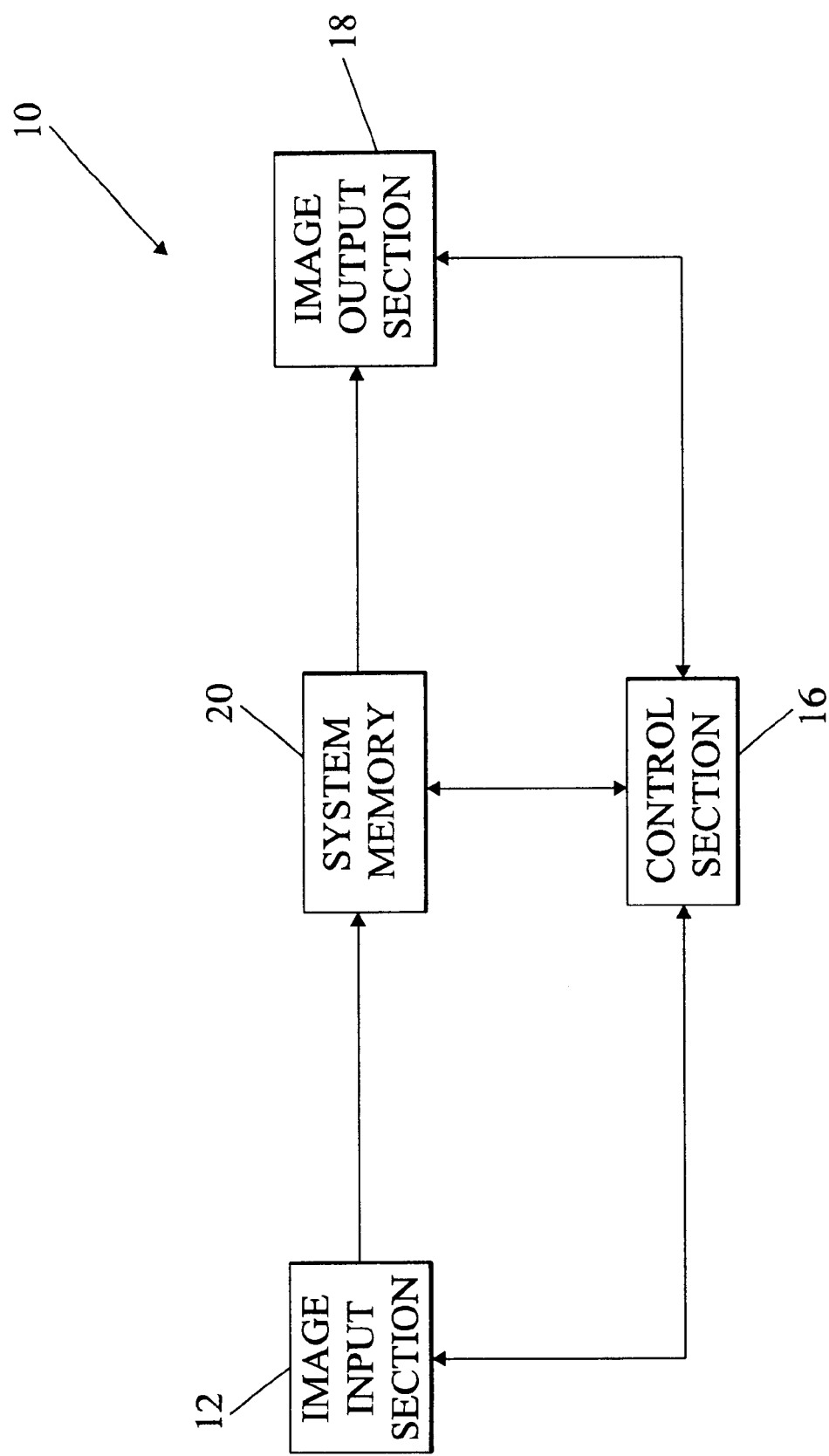
FIG. 1 is a simplified image flow diagram of an image reproduction system suitable for employing a data flow control and storage facility according to the teachings of the invention.

FIG. 1 provides a simplified image flow diagram of an exemplary digital image copier 10 suitable for employing a data flow control and storage facility according to the teachings of the invention. The copier 10 includes an image input section 12, a control section 16, and an image output section 18. The copier 10 also includes a system memory 20. The input section 12 is adapted for acquiring or receiving an image of a document. Subsequent to acquiring or receiving a document image, the input section 12 transfers the image data to the system memory section 20. The system memory 20 can include any suitable non-DRAM secondary storage elements adapted for storing image data. According to the illustrative embodiment of the invention, the system memory 20 is preferably magnetic disk memory. However, in alternative embodiments the system memory may include, but is not limited to, optical disks, magnetic tape or non-DRAM solid state memory. The control section 16 includes elements for controlling the transfer of image data from the input section 12 to the system memory 20, as well as for controlling the transfer of the image data from the system memory 20 to the image output section 18. Although the control stage 16 is depicted logically as a separate block, the control section 16 can be distributed throughout the copier 10. The illustrated image output section 18 can include any suitable apparatus for reproducing the image on a substrate, such as a conventional printer or copier, both of which are known and well characterized in the art.

Figure 2:
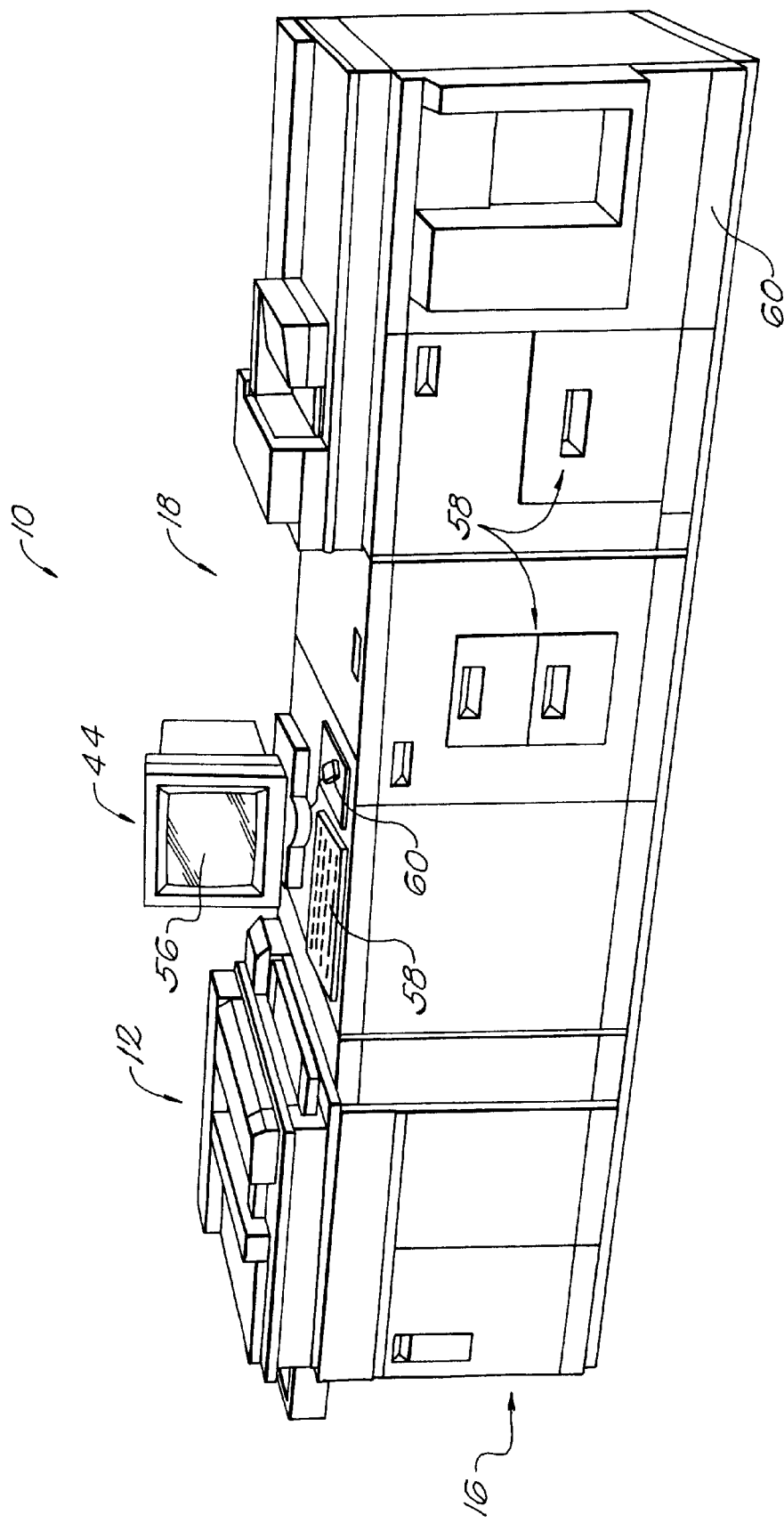
FIG. 2 is a perspective view of an electrophotographic printing system suitable for employing a data flow control and storage facility according to the teachings of the invention.

FIG. 2 is a perspective view of the general purpose digital image copier 10 of FIG. 1. As stated above, the digital image copier 10 employs a data flow control and storage facility according to the teachings of the invention. The illustrated digital image copier 10, for purposes of explanation, is once again logically divided into multiple sections according to functionality. As illustrated in FIG. 1, those sections include an image input section 12, a control section 16, and an image output section 18. The image input section 12 includes both local (i.e., on-site) and remote image input interfaces, thus enabling the system 10 to provide network, scan, and print services in a single integrated system. Other system combinations and arrangements can also be employed in the digital image copier 10 and would be obvious to the ordinarily skilled artisan, such as a stand alone printing system with on-site image input (i.e., a scanner), controller and printer assemblies; a network printing system with remote input, controller, and printer assemblies; and like system configurations.

While a specific printer-type image output section 18 is shown and described in the exemplary digital image copier 10, the invention also contemplates using other types of printing systems. For example, the image output section 18 can instead employ an ink jet printer, an ionographic printer, a thermal printer, a photographic printer and the like. Furthermore, the image output section 18 can be incorporated in electronic display systems, such as CRTs, LCD's, LED's, or other like image scanning, processing, or recording systems, or alternatively, other signal transmitting, receiving and recording systems.

Figure 3:
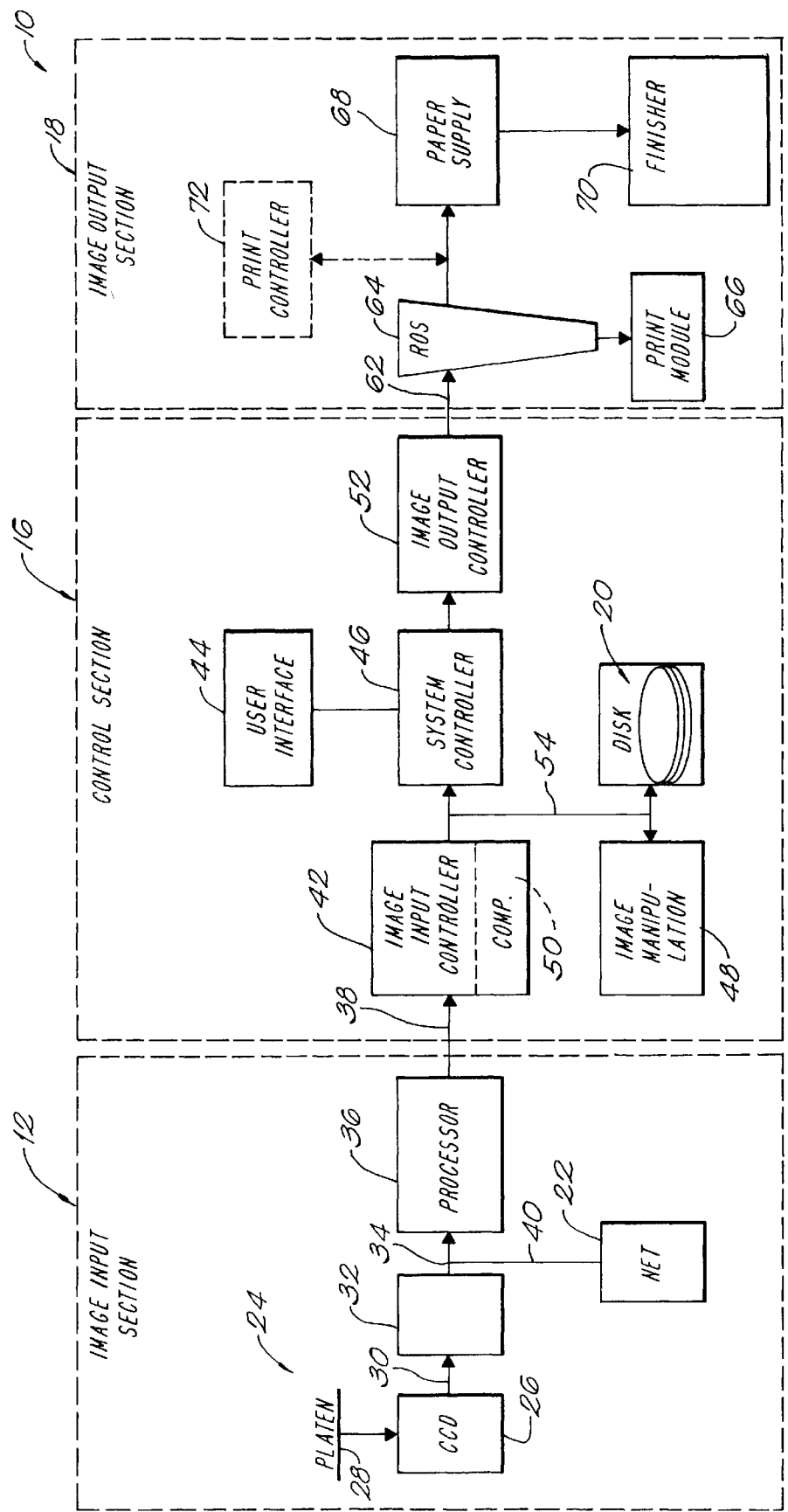
FIG. 3 is a schematic block diagram depicting the major components of the system of FIG. 2.

FIG. 3 is a logical block diagram depicting the major components of the digital image copier 10 of FIGS. 1 and 2. For explanation purposes, the system 10 is logically a portioned into the image input section 12, the control section 16 and the output section 18. However, as skilled artisans will appreciate, the locations of the various elements shown in sections 12, 16 and 18 can be rearranged without affecting the operation of the copier 10. With reference to FIGS. 2 and 3, the image input section 12 includes a network interface 22 for remote or off-site transmission of image data into the copier 10. The network interface 22 preferably includes a suitable communication channel, such as a telephone line, for enabling image data to be transferred into the image input section 12 from one or more remote sources. Alternate embodiments of the invention include remote image data sources, such as streaming tape, floppy disk, video camera, and the like.

For on-site image input, the image input section 12 includes a document scanner 24 that optionally employs a universal or automatic document handler (not shown) for the purpose of automatically and sequentially placing and locating documents for scanning. Alternatively, the document scanner 24 provides manual document mode and/or a computer forms feeder (CFF) mode, the latter to accommodate documents in the form of computer fanfold. The scanner 32 incorporates one or more linear light sensitive or photoelectric arrays 26, such as the illustrated charge-coupled device (CCD), for reciprocating scanning movement below a glass platen 28. An associated optical arrangement focuses light reflected from a document on the platen 28 onto the photoelectric array 26. The photoelectric array 26, in response, generates electric image output signals 30 (e.g., pixels) and couples those signals to an analog-to-digital converter 32 for conversion into digital image data or signals 34. The converter 32 then couples the digital image signals 34 to a processor 36 for further processing.

The illustrated processor 36 places the digital image data 34 in condition for printing by enhancing and/or altering the digital image data 34. By way of example, the processor 36 can perform filtering, thresh holding, screening, cropping, scaling and related functions. Following any changes or adjustments, the processor 36 forwards the conditioned digital image data 38 to the control section 16. Similarly, the network interface 22 conveys remotely received image data signals 40 to the processor 36 for manipulation and forwarding to the control section 16.

For explanation purposes, the system memory 20 is included in the discussion of the control section 16. As shown, the control section 16 includes an image input controller 42, a user interface 44, a system controller 46, the system memory 20, an image manipulation section 48, an image compression section 50, and an image output controller 52. The image input controller 42 receives the digital image data 38 from the processor 36. The image compression section 50 compresses the image data 38 according to known compression algorithms. The compression section 50 also segments the image data 38 into slices that are (n) scan lines wide; each slice having a slice pointer. The image input controller 42 stores the compressed image data 56, together with the slice pointers and any related image descriptors providing image specific information (such as height and width of the document in pixels, the compression method used, pointers to the compressed image data, and pointers to the image slice pointers), to an image file. The image files representing different print jobs can be stored in the system memory 20.

The user interface 44, as shown in FIG. 2, includes a combined controller/display consisting of an interactive touch screen 56, a keyboard 58 and a mouse 60. The user interface 44 preferably enables the operator to interface with the output section 18, to program print jobs; execute instructions; and obtain system operating information, instructions, programming information and icons, diagnostic information, visual document facsimile display and pictorial views, and the like. Items displayed on the touch screen 56, such as files and icons, are actuated by either touching the displayed item on the screen 56 or by using the mouse 60 to manipulate a cursor to select an item.

According to the illustrative embodiment, the system memory 20 includes a plurality of magnetic memory disks for storing the compressed image data 54, as well as other data known in the art, such as machine operating system software, machine operating data and the like. The system controller 46, among other functions, directs transfer of the image data 54 stored in the system memory 20. If processing other than that provided by the processor 36 is required, the system controller 46 transfers the image data 54 to the image manipulation section 48. The image manipulation section 48 performs additional processing, such as collation, decomposition, and related formatting operations. Following the additional processing, the system controller 46 returns the image data 54 to the system memory 20. Additionally, the system controller 46 can transfer the image data 54 to the user interface 44 for display, or to the image output controller 52 for printing.

The image output controller 52 decompresses and readies the image data 54 for printing, and then forwards the print-ready image data 62 to the image output section 18. To provide storage space for new image data, the system controller 46 purges the image data 54 from the system memory 20, subsequent to that data being received by the printer stage 28.

Referring again to FIGS. 2 and 3, the illustrated image output section 18, for purposes of explanation, is logically divided into a raster output scanner (ROS) section 64, a print module 66, a paper supply section 68, and a finisher section 70. The ROS section 64 employs a radiation source, such as a laser, to provide one or more imaging beams that are scanned across a moving photoreceptor of the print module 66 by any suitable structure, such as by a rotating polygon. This creates a latent electrostatic image on portions of a photoreceptor, which can be subsequently developed by a developer stage in accordance with known techniques, and then transferred to a print media delivered by the paper supply section 68. As will be appreciated by those skilled in the art, the print media can include various known substrates which are capable of accepting an image. Example substrates include transparencies, preprinted sheets, vellum, glossy covered stock, film and the like. The print media can also include any of a variety of sheet sizes, types, and colors, and for this, plural media supply trays of the paper supply section 68 can be provided. The developed image transferred to the print media is permanently fixed or fused and the resulting prints discharged to either an output tray or to the finisher 70. The finisher 70 provides certain finishing selections, such as a stitcher for stitching the prints together to form books, a thermal binder for adhesively binding the prints into books, and/or other finishing options such as stapling, slitting, perforating, saddle stitching, folding, trimming, or the like.

As previously mentioned, the system control functions embodied in the schematic representation of the system controller 46 can be distributed throughout the illustrated digital image copier 10. To that end, the copier 10 may employ an optional print controller 72 to control the printer functions and operations in accordance with selected job program parameters. According to one embodiment, an operator provides such job program parameters by way of the user interface 44. Alternatively, program parameters are derived from sensor signals and processes within the image output section 18.

As discussed above, conventional systems typically employ large amounts of DRAM for intermediately storing image data. By way of example it is not uncommon for a digital copier to use as much as 250 M-bytes as a page buffer. During scanning, as DRAM fills, a disk controller, operating as a bus master, typically spools the image data from the DRAM page buffer to magnetic disk memory. Subsequently, during printing, the disk controller typically spools the image data back from the magnetic disk memory to the DRAM page buffer. A system embodying features of the invention reduces the amount of DRAM required for scanning and/or printing the image data by eliminating the DRAM page buffer. By way of example, an illustrative embodiment of the invention can significantly reduce or eliminate the use of any DRAM. According to one embodiment, the invention achieves this enhancement by writing the scanned image data from the image input section 12 directly to the system memory 20, without intermediately writing the data to a DRAM page buffer. Hence, the system avoids the use of an intermediate, costly memory device. During printing, the invention transfers the image data back from the system memory 20 to the image output section 18. According to an illustrative embodiment, the invention utilizes features of the PCI bus to perform burst transfers of blocks of image data between the system memory 20 and I/O devices, such as scanners and printers.

Figure 4:
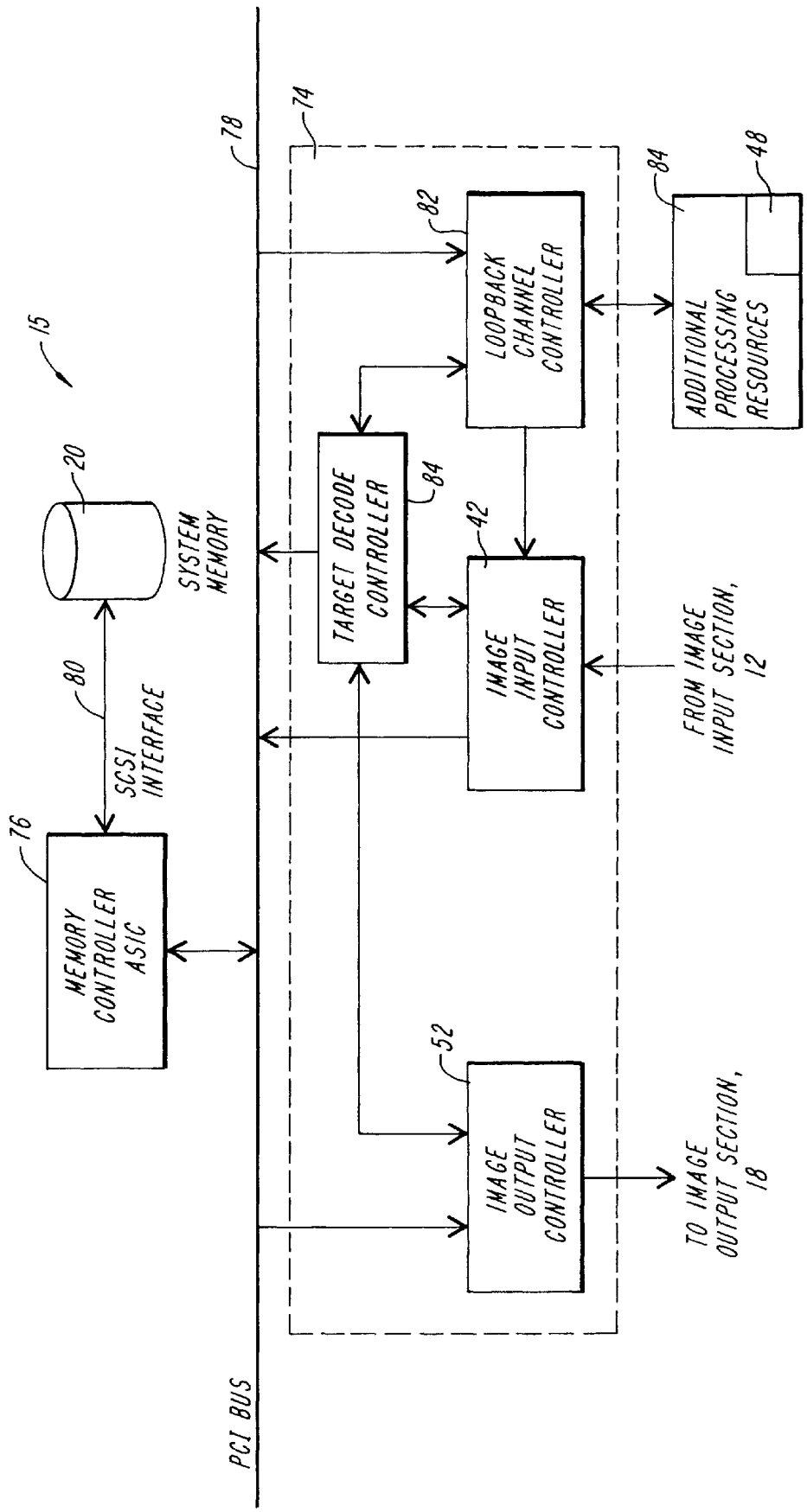
FIG. 4 is a logical block diagram of a data flow control and storage facility according to an illustrative embodiment of the invention.

FIG. 4 is a logical block diagram of a data flow control and storage facility 15 (hereinafter "the facility 15") according to an illustrative embodiment of the invention. As can be seen, the illustrated facility 15 has a number of components in common with the control section 16 of FIG. 3. More particularly, the facility 15 includes a video ASIC 74 and a memory controller ASIC 76, coupled together over a PCI bus 78. The illustrated facility 15 also includes the system memory 20, coupled to the memory controller ASIC 76 by way of an SCSI interface 80. The illustrated video ASIC 74 includes the image input controller 42, the image output controller 52 of the control section 16, along with a loop-back channel controller 82. A target decode and control network section 84 provides, among other functions, address decoding logic for the image input controller 42, the image output controller 52 and the loop-back channel controller 82.

In operation, the facility 15 of FIG. 4 can transfer image data between the system memory 20 and any of the image input section 12, the image output section 18 and additional processing resources 85, by way of the PCI bus 78 and the memory controller ASIC 76.

More specifically, in response to a scan operation being initiated, the memory controller ASIC 76, operating in master mode, gains control of the PCI bus 78, and requests a block of data from the image input controller 42. Until the input controller 42 has a block of image data to transfer, the controller generates and forwards disconnect signals to the memory controller ASIC 76 by way of the PCI bus 78. Once the image input controller 42 has received a block of image data from the image input section 12, it transfers the image data onto the PCI bus 78. The memory controller ASIC 76 thus receives the block of data and stores it to the system memory 20 by way of the SCSI interface 90.

In response to the initiation of a print operation, once again, the memory controller ASIC 76, operating in master mode, gains control of the PCI bus 78. Subsequent to gaining control of the PCI bus 78, the memory controller ASIC 76 signals the image output controller 52 to determined if the image output controller 52 has sufficient memory available to receive a block of image data. If the image output controller 52 does not have a sufficient amount of memory available to accept the memory controller ASIC's programmed block size, the image output controller generates a disconnect signal and forwards it to the memory controller ASIC 76 over the PCI bus 78.

If the image output controller 52 has enough memory available to accommodate a block of data from the memory controller ASIC 76, it ceases transmission of the disconnect signals and receives the block of image data. The image output controller 52 then transfers the received block of data to the image output section 18. As soon as the image output controller 52 frees up sufficient memory, it once again can receive a block of image data from the memory controller ASIC 76.

The facility 15 also provides a loop-back channel controller 82. According to the illustrated embodiment, the loop-back controller 82 operates in essentially the same fashion as the image output controller 52. In response to a request for additional data processing, the memory controller ASIC 76, operating in master mode, can transfer the image data, a block at a time, from the system memory 20 to the loop-back controller 82. As in the case of the output controller 52, the loop-back controller 82 generates a disconnect signal until it has sufficient memory free to accommodate a block of image data from the memory controller ASIC 76. Subsequent to receiving a block of data from the memory controller ASIC 76, the loop-back controller 82 transfers the block of image data to the additional processing resources 85. The additional processing resources 85 can include the image manipulation section 48, also shown in FIG. 3, as well as other resources obvious to those of ordinary skill in the art.

Subsequent to completing any additional processing, the additional processing resources 85 transfer the image data back to the loop-back channel controller 82. The loop-back channel controller 82, in turn, forwards the image data to the input image controller 42. The memory controller ASIC 76 requests the image data from the input controller 42 in the same fashion as if the data was received from a scan operation.

According to the illustrated embodiment of the invention, the memory controller ASIC 76 performs data transfers between the system memory 20 and the controllers 42, 52 and 82 using a data burst transfer scheme. Burst transfers over the PCI bus 78 are well characterized in the art. However, according to other embodiments, other transfer protocols can be employed, such as SBUS transfers.

The target decode and control logic 84 provides, among other functions, address decoding for buffer memory included in the image output controller 52, the image input controller 42 and the loop-back controller 82.

Figure 5:
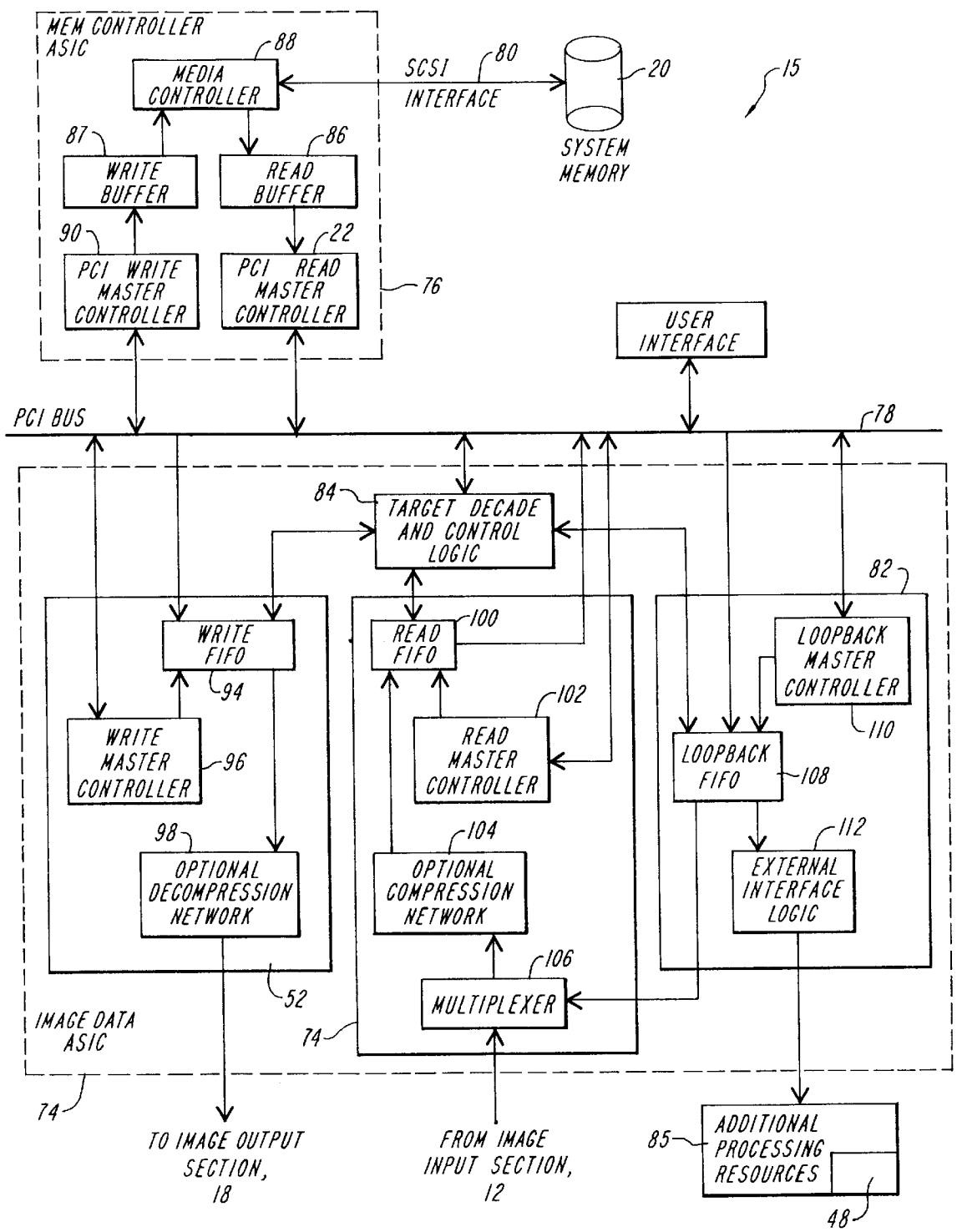
FIG. 5 is a more detailed schematic block diagram of the data flow control and storage facility of FIG. 4.

FIG. 5 is a more detailed logical block diagram of the facility 15 of FIG. 4. As previously discussed, the facility 15 includes a memory controller ASIC 76, an image data ASIC 74, a system memory 20 and additional image data processing resources 48. The memory controller ASIC 76, operating in master mode, communicates with the image data ASIC 82 over a PCI bus 78. The memory controller ASIC 76 communicates with the system memory 20 by way of an SCSI interface 80. The memory controller ASIC 76, operating in master mode, controls the transfer of image data between the magnetic disk storage unit 20 and the image data ASIC 74. The image data ASIC 74 interfaces between PCI bus 78 and the image input section 12, the image output section 18, and the additional processing resources 85.

The memory controller ASIC 74 includes a write buffer 87, a read buffer 86, a media controller 88, and PCI read and write bus masters 90 and 92. The write buffer 87 stores blocks of data during burst data transfers from the PCI bus 78 to the system memory 20. Similarly, the read buffer 86 stores blocks of data during burst data transfers from the system memory 20 to the PCI bus 78.

The image data ASIC 74 includes the image input controller 42, the image output controller 52, the loop-back channel controller 82 and the target decode and control logic 84, as illustrated in FIG. 4.

The image output controller 52 includes a write FIFO memory 94, a write master controller 96, and optionally includes a decompression network 98. Similarly, the image input controller 42 includes a read FIFO memory 100, a read master controller 102, and optionally includes a compression network 104. The image input controller 42 also includes a multiplexer 106 for selecting between a signal from the image input section 12 and the loop-back controller 82. The loop-back controller 82 includes a loop FIFO memory 108, a loopback master controller 110 and external interface logic 112.

According to the illustrated embodiment, the read and write FIFOs 100 and 94, respectively, map to selected memory addresses and operate essentially like cache memory. The write FIFO 94 accepts the image data transferred by the disk controller ASIC 76 from the system memory 20 to the image output section 18. Alternatively, the read FIFO 100 accepts the image data transferred by the memory controller ASIC 76 from the image input section 12 to the system memory 20. Typically, the FIFOs 100 and 94 are between about 128-bytes and 8 M-bytes. Even at 8 M-bytes, the relatively inexpensive FIFOs 100 and 94 provide considerable cost savings over the prior 256 M-byte DRAM page buffers. Hence, the present invention avoids the need of placing expensive memory devices, such as DRAM, between the image data ASIC 74 and the PCI bus 78.

During a scan operation, the multiplexer 106 buffers the image data from the image input section 12 into the image data ASIC 74. The multiplexer 106 couples the image data to the optional compression network 104. The optional compression network 104 performs known compression algorithms to reduce the amount of memory space required to store the image data, and passes the image data to the read FIFO 100. According to one preferred embodiment, the compression network 104 employs a modified lossless LZ compression algorithm.

During initialization, the memory controller ASIC 76 acquires the memory mapped address of the read FIFO 100. The media controller 88 acquires the proper block and burst size, along with the SCSI parameters that are necessary for management of the system memory 20.

In response to a scan request, the memory controller ASIC 76 initiates an image data transfer from the read FIFO 100 to the system memory 20 by signaling the write master controller 90 to initiate a request grant sequence and to obtain control of the PCI bus 78. Once gaining control of the PCI bus 78, the write master controller 90 provides the memory mapped address for the read FIFO 100, along with the size of the block to be transferred. During the address phase of the PCI transfer, the target decode and control logic 84 of the image data ASIC 74 decodes the address signals from the write master controller 90 to read the FIFO 100. If the FIFO 100 does not yet contain a full block of scan data, the read master controller 102 signals a disconnect over the PCI bus 78, without providing any of the requested image data. In response, the write master controller 90 retries the PCI bus 78 until a transfer is achieved. The write master controller 90 queries the bus 78 until a full block of scan data from the image input section 12 is available in the read FIFO 100. As skilled artisans will appreciate, the fewer clock cycles used to perform the disconnect operation by the read FIFO master controller 102, the more efficient the PCI bus performance will be.

According to a further embodiment of the invention, during initialization the read FIFO 100 is programmed with thresholds related to the burst/block size for which the media controller 88 is programmed. By way of example, if the media controller 88 is programmed for 8-word bursts/blocks on the PCI bus 78, the read FIFO master controller 102 can be programmed to signal disconnects, without data, until 8-words are present in the read FIFO 100. This approach reduces the number of bus retries performed by the PCI write master controller 90. As the PCI write master controller 90 receives image data from the read FIFO 100, it transfers the image data to the memory write buffer 87. In turn, the media controller 88 transfers the image data from the write buffer 87 to the system memory 20 by way of the SCSI interface 80. The media controller 88 removes image data from the write buffer 87 on a FIFO basis. According to the illustrated embodiment, the write buffer 87 can be 128-bytes or larger.

During initiation of a print operation, the PCI read master controller 102 is programmed with the memory mapped address of the write FIFO 94. The block size is also programmed, along with other SCSI parameters. The media controller 88 reads image data to be printed from the system memory 20 by way of the SCSI interface 80 and stores the image data in the read buffer 86. Once the read buffer 86 contains an amount of data equal to the programmed burst/block size, the PCI read master controller 92 initiates a request grant sequence to obtain control of the PCI bus 78. Subsequent to obtaining control of the PCI bus 78, the PCI read master controller 92 initiates the address phase of the PCI transfer, providing the memory mapped address of the write FIFO 94, along with the programmed block size. During the address phase, the target decode and control logic 84 decodes the address signals from the PCI read master controller 92 to the write FIFO 94. If there is not enough memory available in the write FIFO 94 to accommodate the programmed burst size, the write master controller 96 generates and transfers a disconnect signal onto the PCI bus 78. The PCI read master controller 92 continues image data transfer attempts until successful.

According to the illustrated embodiment, the target decode and control logic 84 detects insufficient memory in the write FIFO 94 by monitoring a "partially full" flag in the write FIFO 94. The FIFO 94 deactivates the "partially full" flag in response to having enough memory available to accommodate the burst size of the media controller 88.

Consequently, at the initiation of a print operation, several transfers are required to fill the FIFO 94 before disconnects commence. Once the FIFO 94 has been filled, the write master controller 96 issues disconnect and retry commands until the image output section 18 transfers enough data out of the write FIFO 94 to accommodate for another data burst. When the image output section 18 empties the write FIFO 94 to a threshold below the programmed burst size of the media controller 88, the write master controller 96 once again transfers data without issuing disconnect and retry commands. Preferably, the write master controller 96 only issues disconnect commands if there is not enough room in the FIFO 94 to store the burst of image data from the system memory 20. If the bandwidth of the image output section 18 is much slower than the effective bandwidth of the system memory 20, the "partially full" flag of the write FIFO 94 will persist, along with disconnect and retry commands, while the system memory 20 waits for the image output section 18 to catch up.

According to a further aspect of the invention, the memory controller ASIC 76 exploits the timing of data transfers over the PCI bus 78 to perform concurrent read and write operations.

According to another embodiment, the image input controller 42 includes a compression network 104 coupled between the scan interface circuitry and the read FIFO 100. The compression network 104 compresses image data received from the image input section 12 according to known compression algorithms. Although the system memory 20 provides potentially unlimited storage capacity, decreasing the image size through compression lowers memory bandwidth requirements. According to a further feature, the image output controller, optionally, includes a decompression network 98 coupled between the output of the write FIFO 94 and the image output section 18. The decompression network 98 restores the image data to a raw bit or byte map according to known algorithms, and buffers the raw image data to the image output section 18.

The facility 15 optionally includes additional memory mapped channels. By way of example, the illustrated image data ASIC 74 includes a loop-back channel having a loop-back channel controller 82. The loop-back channel controller 82 includes a loop-back FIFO 108, a loop-back FIFO master controller 110 and external interface logic 112. Loop-back operation is substantially identical to operation of the image output controller 52. That is, the memory controller ASIC 76 reads image data from the system memory 20 and writes the image data to the loop-back FIFO 108. The loop-back master controller 110 can direct the output of the loop-back FIFO 108 back through the multiplexer 106 or through the external interface logic 112 to a multitude of image processing resources 85 for performing functions such as compression, rotation, scaling and the likes since the loopback channel controller 82 forms an additional data pathway, the memory controller ASIC 76 can throttle the image data by the external resources 86 regardless of overflow conditions of data pathways (pipelines) that cannot be interrupted, such as the print and scan devices included in the image output and input sections 18 and 12.

According to a further feature of the illustrated embodiment, the facility 15 performs image processing functions on image data that has been previously stored in the system memory 20. Prior systems, typically, transfer the image data from a magnetic disk memory to a DRAM page buffer and a read master controller reads the image data from the DRAM via a loop-back master channel. However, according to the illustrated embodiment of the invention, and as described above, the memory controller ASIC 76, operating in master mode, transfers the image date directly to the additional processing resources 85, without intermediately storing the image data to a DRAM page buffer. Specifically, the copier 10 can employ a facility 15 that transfers image data between system memory and an image data ASIC 74 without requiring temporary storage of the data in an intermediate storage element, such as DRAM. Post image processing functions, such as those performed by the image manipulation section 48 of FIG. 3, are usually considered non-real-time functions. However, by avoiding middle step operations, such as intermediate data transfers to DRAM, real-time operations can be performed concurrently with non-real-time operations. Those of ordinary skill will readily recognize that other processing functions can be employed on the image data during transfer between the memory controller 76 and the image data ASIC 74, and intended to be covered by the present invention.

Although prices have been dropping, DRAM is still a significant cost in an image reproduction system. Additionally, magnetic disk memory prices have also been dropping, while bandwidths have been increasing. Currently magnetic disk memories having 12 Mbytes/second effective bandwidth are available. This bandwidth allows a monochrome only, 1200 by 600 spots per inch copier, to operate at about 30 copies per minute concurrent scan/print, with worst case compression (RAW). The technological advancements in the area of magnetic disk memories, in combination with methodologies of the present invention, reduce the need for DRAM page buffers in digital copiers.

FIG. 6 depicts a simplified flowchart 116 illustrating a method of performing image reproduction according to one embodiment of the invention. With reference to FIGS. 2–6, a scan operation begins with a scan request 118. According to the illustrated embodiment of the invention, an operator can issue a scan request by way of the user interface 44. As shown at 120, in response to a scan request 118, the photoelectric array 26 scans a document on the platen 28 into the image data ASIC 74. As indicated at 506, and as discussed in more detail above, the converter 38 and the input processor 40 (shown together as the scanner interface circuitry 120 in FIG. 4) digitally convert and condition the image data. As shown at 124, the optional compression network 104 compresses the image data according to well known algorithms. As described in detail above, and as indicated at step 126, the memory controller ASIC 76, operating in master mode, reads the compressed image data from the read FIFO 100 via the PCI bus 78 and writes the compressed image data to the system memory 20 via the SCSI interface 80.

As indicated at 128 and as discussed with respect to FIG. 3, the system controller 46 can respond to requests for additional processing from various sources, including the user interface 44 and the optional print controller 72. As indicated at step 130 and as discussed with respect to FIGS. 4 and 5, in response to a request for additional processing, the media controller 88 retrieves the image data from the system memory 20. The read master controller 92 and the read buffer 86 operate in conjunction with the target decode and control logic 84 and the loopback master controller 110 to transfer the image data through the loopback FIFO 108 and the external interface logic 112 to the additional processing resources 85. As indicated by step 132, the additional processing resources 85 perform additional processing on the image data, if desired. As shown at step 134, and as previously discussed with respect to FIG. 5, subsequent to performing the additional processing, the memory controller ASIC 76, operating in master mode, retrieves the image data from the loopback FIFO 108 and returns the image data back to the system memory 20.

As indicated at 136, the system controller 46 also responds to the presence of a user interface request from the touch screen display 56, the keyboard 58 and the mouse 60 of the user interface 44. If there is a request, the system controller 46 retrieves a copy of the image data from the system memory 20 and transfers that copy to the user interface 44 for display (steps 138 and 140). If there are no requests, the facility 15 then determines if there are any print requests.

As shown at step 142, the system controller 46 can respond to print requests from, among other sources, the user interface 44. As indicated in steps 144 through 150 and as discussed in further detail with respect to FIG. 3, in response to a print request, the system controller 46 retrieves a block of image data from the system memory 20 and transfers the image data directly to the image output controller 52. According to the illustrative embodiment, the image data is not intermediately stored in DRAM. The image output controller 52 decompresses and readies the image data for printing and forwards the print-ready image data to the printer stage 28. As specifically indicated at step 144 and as discussed in more detail with respect to FIG. 5, the media controller 88 retrieves the data from the system memory 20 by way of the SCSI interface 80. The PCI controller 92 reads the image data from the read buffer 86 and transfers it using burst transfers directly to the write FIFO 94. The write master controller 96 signals the PCI controller 92 via the PCI bus 78 when the write FIFO 94 has sufficient free memory to accommodate a burst of data. The target decode and control circuitry 84 decodes the address of the write FIFO 94 from the PCI controller 92.

As specifically indicated at step 146 and also discussed in detail with respect to FIG. 5, the write FIFO 94, optionally, transfers the image data to be printed to the decompression network 98. As shown at step 148 and discussed with regard to FIG. 4, the decompression circuitry 98 transfers the decompressed image data to the image output section 18 for printing. In step 150, the media controller 88 purges the system memory 20 of the transferred image data.

Although the illustrative flowchart 116 shows various steps occurring sequentially and in a particular order, the depicted steps can be rearranged and in some cases can occur concurrently, without departing from the essence of the invention. By way of example, according to a further embodiment of the invention, the steps involved in scanning an image into the system 10 can proceed concurrently with the steps involved in printing image data, previously stored in the system memory 20.

As discussed above with respect to FIGS. 1 through 5, an advantage of the illustrative system of the invention is that it does not require image data to be intermediately spooled between the system memory 20 and a DRAM page buffer. As described with respect the method of FIG. 6, according to the illustrative embodiment of the invention, the memory controller ASIC 76 reads scanned image data in bursts over the PCI bus 78 and writes the bursts of image data to the system memory 20. Similarly, during print operations, the memory controller ASIC reads blocks of image data to the image output section 18 for image data from the system memory 20 and writes the blocks of image data to the image output section 18 for printing. According to the invention, no DRAM page buffer is necessary.

It will thus be seen that the invention efficiently attains the objects set forth above, including reducing the amount of DRAM required to operate image reproduction systems and increasing the speed with which image data can be transferred by reducing the number of intermediate memory spooling operations. Since certain changes may be made in the above constructions and the described methods without departing from the scope of the invention, it is intended that all matter contained in the above description or shown in the accompanying drawings be interpreted as illustrative and not in a limiting sense.

Having described the invention, what is claimed as new and protected by Letters Patent is:

1. An image data flow control and storage facility for operation in an image reproduction system, said facility comprising a digital communication bus for transferring digital image data within said image reproduction system, a secondary storage device for storing digital image data within said image reproduction system, an image output controller in digital communication with said digital communication bus and adapted for receiving digital image data by way of said digital communication bus and for outputting said received digital image data, an image input controller in digital communication with said digital communication bus for transferring said digital image data to said facility by way of said digital communication bus, and a secondary storage controller in digital communication with said secondary storage device and said digital communication bus, and adapted for transferring at least one of digital image data directly from said secondary storage device to said image output controller, and digital image data directly from said image input controller to said secondary storage device, both by way of said digital communication bus.

2. An image data flow control and storage facility according to claim 1, wherein said secondary storage device comprises one of an optical storage device and a magnetic storage device.

3. An image data flow control and storage facility according to claim 1, wherein said secondary storage device is a non-DRAM solid state storage device.

4. An image data flow control and storage facility according to claim 1, wherein said digital communication bus comprises a PCI-type bus.

5. An image data flow control and storage facility according to claim 1, wherein said secondary storage controller is adapted for gaining control of said digital communication bus and for transferring blocks of digital image data over said bus in a burst format.

6. An image data flow control and storage facility according to claim 4, wherein said secondary storage controller is adapted for operating in master mode to gain control of said digital communication bus and for transferring blocks of digital image data in a PCI-type burst format.

7. An image data flow control and storage facility according to claim 1, wherein said secondary storage controller includes a buffer cache memory having a write buffer portion for accumulating a block of digital image data for direct transfer from said image input controller to said secondary storage device, and a read buffer portion for accumulating a block of digital image data for direct transfer from said secondary storage device to said image output controller.

8. An image data flow control and storage facility according to claim 7, wherein said buffer cache memory comprises a FIFO-type cache memory.

9. An image data flow control and storage facility according to claim 7, wherein said image output controller comprises an output cache memory for accumulating a block of digital image data for outputting, and said secondary storage controller includes a read master controller for determining whether said output cache memory has enough storage available to receive a block of digital image data and for writing a block of digital image data from said read buffer portion of said buffer cache memory directly to said output cache memory in response to determining that enough storage is available.

10. An image data flow control and storage facility according to claim 9, wherein said read master controller comprises means for querying said image output controller to determine whether said output cache memory has enough storage available to receive a block of digital image data, and said image output controller includes output control elements in digital communication with said output cache memory and with said digital communication bus, wherein said output control elements, in response to a query from said read master controller, signal said read master controller regarding whether there is enough storage available in said output cache memory to receive a block of digital image data.

11. An image data flow control and storage facility according to claim 10, wherein said output control elements are configured for generating a PCI-type disconnect signal for said read master controller when there is not enough storage available in said output cache memory to receive a block of digital image data.

12. An image data flow control and storage facility according to claim 9, wherein said output cache memory comprises a FIFO-type cache memory.

13. An image data flow control and storage facility according to claim 7, wherein said image input controller has an associated input cache memory for accumulating a block of digital image data for transfer to said write buffer portion of said buffer cache memory, and said secondary storage controller includes a write master controller for determining whether said input cache memory has accumulated a block of digital image data and for reading said block of digital image data directly from said input cache memory to said input buffer portion of said buffer cache memory in response to determining that a block of digital image data has been accumulated.

14. An image data flow control and storage facility according to claim 13, wherein said write master controller is adapted for querying said image input controller to determine whether said input cache memory has accumulated a block of image data, and said image output controller includes input control elements in digital communication with said input cache memory and with said digital communication bus, wherein said input control elements, in response to a query from said PCI write master controller, signal said PCI write master controller regarding whether said input cache memory has accumulated a block of digital image data.

15. An image data flow control and storage facility according to claim 14, wherein said input control elements signal a PCI-type disconnect, without transferring any image data to said PCI write master controller in response to said input cache memory not accumulating a block of digital image data.

16. An image data flow control and storage facility according to claim 13, wherein said input cache memory is a FIFO-type cache memory.

17. An image data flow control and storage facility according to claim 1 further comprising an SCSI communication interface between said secondary storage device and said secondary storage controller.

18. An image data flow control and storage facility according to claim 1 further comprising a loopback channel controller in digital communication with said digital communication bus and adapted for receiving digital image data by way of said digital communication bus and for outputting said received digital image data for additional processing, and said secondary storage controller is further adapted for transferring digital image data directly from said secondary storage device to said loop-back channel controller by way of said digital communication bus.

19. An image data flow control and storage facility for operation in an image reproduction system having image data input and image data output interfaces, said facility comprising a secondary storage device for storing image data within said image reproduction system, means for transferring said image data into said secondary storage device, without intermediately storing said digital image data in a DRAM buffer, and means for transferring digital image data, stored in said secondary storage device, to said image data output interface of said image reproduction system, without intermediately storing said digital image data in a DRAM buffer.

20. A method of transferring image data in an image reproduction system, said method comprising, transferring digital image data from an image input section of said image reproduction system directly to a secondary storage device, without intermediately storing said digital image data in a DRAM buffer, and transferring said digital image data from said secondary storage device to an image output section of said image reproduction system, without intermediately storing said digital image data in a DRAM buffer.

21. A method of transferring image data in an image reproduction system according to claim 20, wherein said method further comprises providing a digital communication bus for transferring said digital image data between said image input section and said secondary storage device, and between said image output section and said secondary storage device, and transferring blocks of said digital image data from said image input section to said secondary storage device by way of said digital communication bus.

22. A method of transferring image data in an image reproduction system according to claim 21, wherein said method further comprises transferring blocks of said digital image data from said secondary storage device to said image output section by way of said digital communication bus.

* * * * *